United States Patent
Lin et al.

(10) Patent No.: US 11,546,073 B2
(45) Date of Patent: Jan. 3, 2023

(54) CONTROL METHOD AND TIME AWARE BRIDGE DEVICE FOR SEAMLESS PRECISION TIME PROTOCOL

(71) Applicant: Realtek Semiconductor Corp., HsinChu (TW)

(72) Inventors: Yung-Kun Lin, HsinChu (TW); Chung-Keng Hung, HsinChu (TW); Yan-Liang Wu, HsinChu (TW); Kai-Wen Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/308,976

(22) Filed: May 5, 2021

(65) Prior Publication Data

US 2021/0367696 A1 Nov. 25, 2021

Related U.S. Application Data

(60) Provisional application No. 63/026,734, filed on May 19, 2020.

(30) Foreign Application Priority Data

Mar. 25, 2021 (TW) .................. 110110748

(51) Int. Cl.
*H04J 3/06* (2006.01)
(52) U.S. Cl.
CPC .......... *H04J 3/0667* (2013.01); *H04J 3/0644* (2013.01); *H04J 3/0682* (2013.01); *H04J 3/0697* (2013.01)
(58) Field of Classification Search
USPC ....................................................... 370/503
See application file for complete search history.

(56) References Cited

U.S. PATENT DOCUMENTS

| 2010/0001770 A1* | 1/2010 | Bogenberger | ........ H04J 3/0641 327/144 |
| 2013/0077642 A1* | 3/2013 | Webb, III | ............. H04J 3/0661 370/503 |
| 2013/0215910 A1* | 8/2013 | Inomata | ................ H04J 3/0667 370/503 |

(Continued)

FOREIGN PATENT DOCUMENTS

CN 105827570 A 8/2016

OTHER PUBLICATIONS

IEEE Standard for a Precision Clock Synchronization Protocol for Networked Measurement and Control Systems, dated Nov. 7, 2019 (Year: 2019).*

*Primary Examiner* — Gregory B Sefcheck
*Assistant Examiner* — Majid Esmaeilian
(74) *Attorney, Agent, or Firm* — Winston Hsu

(57) ABSTRACT

A control method and a time aware bridge device for a seamless Precision Time Protocol (PTP) are provided. The control method includes: utilizing the time aware bridge device to pre-configure a first control signal source as a master control signal source, and pre-configure a second control signal source as a backup control signal source; utilizing the time aware bridge device to determine whether one or more packets from the master control signal source conform to at least one predetermined rule to generate a determination result; and selectively configuring the second control signal source as the master control signal source according to the determination result.

18 Claims, 6 Drawing Sheets

(56) References Cited

U.S. PATENT DOCUMENTS

2015/0171980 A1\* 6/2015 Bui .................. H04L 45/34
  370/503
2018/0062780 A1\* 3/2018 Shimizu ............... H04N 21/242
2018/0145863 A1\* 5/2018 Chaloupka .............. H04L 67/01

\* cited by examiner

CONTROL METHOD AND TIME AWARE BRIDGE DEVICE FOR SEAMLESS PRECISION TIME PROTOCOL

CROSS REFERENCE TO RELATED APPLICATIONS

This application claims the benefit of U.S. provisional application No. 63/026,734, which was filed on May 19, 2020, and is included herein by reference.

BACKGROUND OF THE INVENTION

1. Field of the Invention

The present invention is related to Precision Time Protocols (PTPs), and more particularly, to a control method and a time aware bridge device for a PTP.

2. Description of the Prior Art

In systems such as automobile electronics or engineering control systems such as robotic arms, components therein (e.g. automobile speakers, screens and brakes, or respective components of a robotic arm) need to be synchronized so as to execute their tasks. This requires a single signal source to provide time information to the majority or all the components in order to make the respective components operate in the same time domain. This signal source may be unable to continuously provide correct time information, however. For example, if transmission of the signal source malfunctions, it will fail to provide the time information at predetermined time points. In another example, malfunctioning of the signal source itself may result in providing incorrect time information.

Thus, there is a need for a novel method, to ensure that respective components within a system can keep obtaining correct time information under various situations.

SUMMARY OF THE INVENTION

An objective of the present invention is to provide a control method and a time aware bridge device for a seamless Precision Time Protocol (PTP), to ensure that a time synchronization operation can be properly performed under various situations.

At least one embodiment of the present invention provides a control method for the seamless PTP, wherein the control method comprises: utilizing a time aware bridge device to pre-configure a first control signal source as a master control signal source and pre-configure a second control signal source as a backup control signal source; utilizing the time aware bridge device to determine whether one or more packets from the master control signal source conform to at least one predetermined rule in order to generate a determination result; and selectively configuring the second control signal source as the master control signal source according to the determination result.

In addition to the aforementioned control method, another embodiment of the present invention provides a time aware bridge device for the seamless PTP. The time aware bridge device comprises a storage device and a processing circuit coupled to the storage device, wherein the storage device stores a program code, and the processing circuit controls operations of the time aware bridge device according to the program code. The aforementioned operations comprises: the processing circuit pre-configures a first control signal source as a master control signal source and pre-configures a second control signal source as a backup control signal source; the processing circuit determines whether one or more packets from the master control signal source conform to at least one predetermined rule in order to generate a determination result; and the processing circuit selectively configures the second control signal source as the master control signal source according to the determination result.

In addition to the above, yet another embodiment of the present invention provides a time aware bridge device for the seamless PTP. The time aware bridge device comprises a selection circuit and a parser. The selection circuit pre-configures a first control signal source as a master control signal source and pre-configures a second control signal source as a backup control signal source. The parser determines whether one or more packets from the master control signal source conform to at least one predetermined rule in order to generate a determination result. More particularly, the selection circuit selectively configures the second control signal source as the master control signal source according to the determination result.

The control method and the time aware bridge device of the present invention specify a master control signal source at the beginning and a backup control signal source thereof in advance. When the operation of the master control signal source is abnormal, the present invention directly switches to the backup control signal source without performing additional or complicated calculations, to ensure that the overall system properly performs time synchronization without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
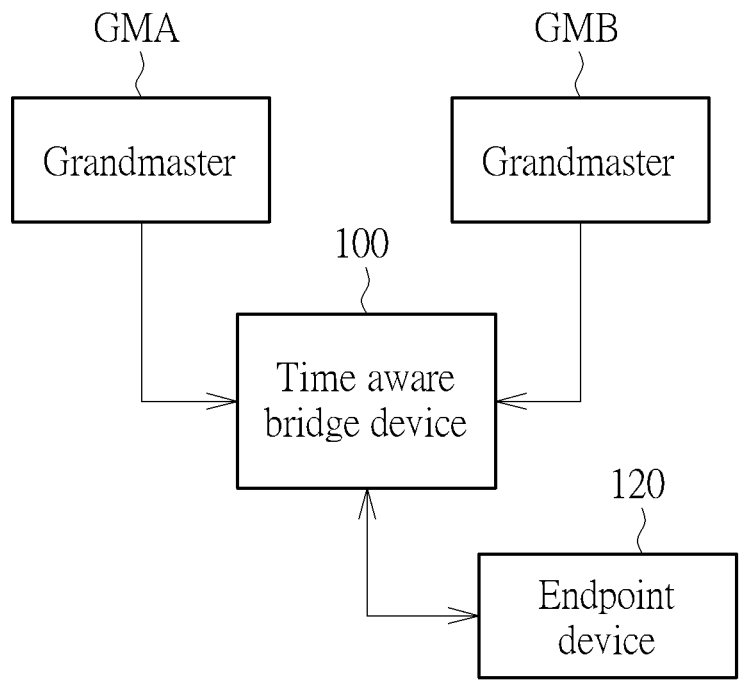
FIG. 1 is a diagram illustrating a time aware bridge device being applied to a time aware system according to an embodiment of the present invention.

FIG. 1 is a diagram illustrating a time aware bridge device being applied to a time aware system according to an embodiment of the present invention. As shown in FIG. 1, the time aware bridge device 100 may receive control signals through wired communications (e.g. including but are not limited to cables and Ethernet) or wireless communications (e.g. including but are not limited to Wi-Fi and Bluetooth) from a plurality of control signal sources, e.g. the time aware bridge device 100 receives control signals from master clocks such as grandmasters GMA and GMB respectively, where the grandmaster GMA may correspond to a first time domain, and the grandmaster GMB may correspond to a second time domain. In addition, the time aware bridge device 100 may transmit the control signals from at least one of the control signal sources (e.g. the grandmaster GMA or GMB) to one or more endpoint devices such as an endpoint device 120 (e.g. a slave device) through wired or wireless communications.

At least one (e.g. a portion or all) of the control signal sources may be a signal source conforming to a Network Time protocol, but the present invention is not limited thereto. In addition, the time aware system may be applied to an automotive electronics device or an engineering control system, where examples of the endpoint device 120 may be automotive speakers, screens and brakes, or respective components of a robotic arm, but the present invention is not limited thereto. As long as an apparatus operates according to the IEEE 802.1As or IEEE 1588 protocol, this apparatus may utilize the time aware bridge device 100 shown in FIG. 1 to perform control of Precision Time Protocol (PTP), and more particularly, may utilize the time aware bridge device 100 to perform management of the control signal sources. Contents of the IEEE 802.1As protocol and the IEEE 1588 protocol are substantially similar, and differences therein may be known by referring to chapter 7.5 of the specification of the IEEE 802.11As protocol. As detailed information related to the IEEE 802.1As protocol and the IEEE 1588 protocol is well-known by those skilled in this art, detailed description is omitted here for brevity.

In some embodiments, when a control signal source that is originally used malfunctions (e.g. transmission is interrupted or abnormal, or the information obtained from this control signal source is abnormal), the time aware system may select a control signal source which is able to provide control signals having the best quality at the time of malfunction among the control signal sources with the aid of a Best Master Clock Algorithm (BMCA), in order to replace the aforementioned malfunctioning control signal source. To further improve efficiency (e.g. reducing additional required software or hardware costs, or reducing time of switching between signal sources), the time aware bridge device 100 may set in advance a certain control signal source as a backup of the aforementioned control signal source that is used at the beginning. When the control signal source that is used at the beginning malfunctions, the used control signal source may be directly switched to the backup control signal source without running the BMCA. For example, the grandmaster GMB may be pre-configured as a backup signal source of the grandmaster GMA, and when control signals received from the grandmaster GMA shows abnormality, the time aware bridge device 100 can directly utilize the grandmaster GMB to take over the task of the grandmaster GMA in order to prevent synchronization operations of the one or more endpoint devices from being affected by malfunction of the grandmaster GMA.

Figure 2:
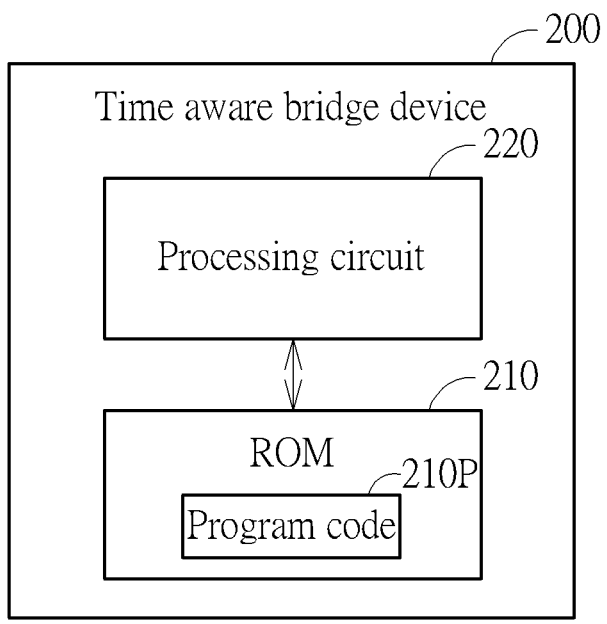
FIG. 2 is a diagram illustrating a time aware bridge device according to an embodiment of the present invention.

FIG. 2 is a diagram illustrating a time aware bridge device 200 according to an embodiment of the present invention, where the time aware bridge device 200 may be an example of the time aware bridge device 100 shown in FIG. 1, and more particularly, the time aware bridge device 200 may be an example of firmware implementation of the time aware bridge device 100. As shown in FIG. 2, the time aware bridge device 200 may comprise a storage device such as a Read Only Memory (ROM) 210 and a processing circuit 220 coupled to the ROM 210, where the ROM 210 may be arranged to store a program code 210P, and the processing circuit 220 may be arranged to control operations of the time aware bridge device 200 according to the program code 210P.

Figure 3:
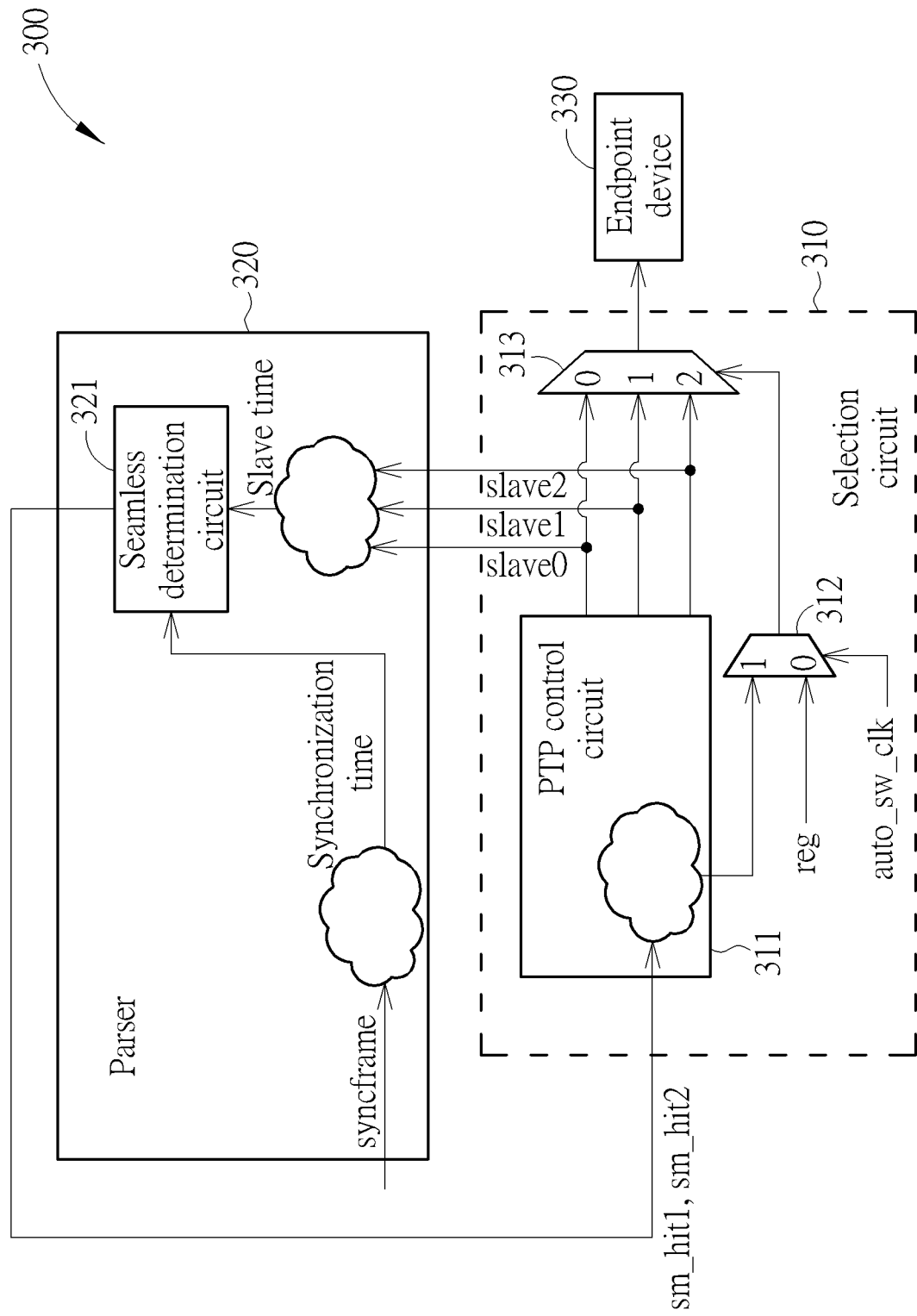
FIG. 3 is a diagram illustrating a time aware bridge device according to another embodiment of the present invention.

FIG. 3 is a diagram illustrating a time aware bridge device 300 according to an embodiment of the present invention, where the time aware bridge device 300 may be an example of the time aware bridge device 100 shown in FIG. 1, and more particularly, the time aware bridge device 300 may be an example of hardware implementation of the time aware bridge device 100. As shown in FIG. 3, the time aware bridge device 300 may comprise a selection circuit 310 and a parser 320, where the selection circuit 310 may comprise a PTP control circuit 311 and multiplexers 312 and 313, and the parser 320 may comprise a seamless determination circuit 321. In this embodiment, the PTP control circuit 311 may receive control signals (e.g. control signals slave0, slave1 and slave2) from the control signal sources through wired or wireless communications, and transmit at least one control signal of these control signals (e.g. one, a portion or all of control signals slave0, slave1 and slave2) to the parser 320. Assume that time information carried by a control signal syncframe may be arranged to indicate time points of various operations executed by the parser 320, where the parser 320 may perform related calculation (illustrated by a clock-shaped block in FIG. 3) on the control signal syncframe to obtain the time information (labeled "Synchronization time") carried by the control signal syncframe, and may perform related calculation (which is briefly illustrated by a clock-shaped block in FIG. 3) on one of the control signals (e.g. one of the control signals slave0, slave1 and slave2) received from the PTP control circuit 311 to obtain time information (labeled "Slave time") carried by this control signal, to allow the seamless determination circuit 321 to generate at least one determination result such as determination results carried by signals sm_hit1 and sm_hit2 to the PTP control circuit 311 according to the synchronization time and the slave time. The PTP control circuit 311 may perform related calculations (illustrated by a clock-shaped block in FIG. 3) on the signals sm_hit1 and sm_hit2 to generate an auto selection signal to the multiplexer 312. In this embodiment, the multiplexer 312 may determine whether to enable an auto switch function of the time aware bridge device 300 according to a mode control signal auto_sw_clk. For example, when a logic value of the mode control signal auto_sw_clk shows "0", the multiplexer 312 may output a manual control signal reg, and the multiplexer 313 may select one of the control signals slave0, slave1 and slave2 according to the manual control signal reg to be output to an endpoint device 330 for performing time synchronization (i.e. the auto switch function is disabled); and when the logic value of the mode control signal auto_sw_clk shows "1", the multiplexer 312 may output the auto selection signal from the PTP control circuit 311, and the multiplexer 313 may select one of the control signals slave0, slave1 and slave2 according to the auto selection signal to be output to the endpoint device 330 for performing the time synchronization (i.e. the auto switch function is enabled), but the present invention is not limited thereto. In this embodiment, the endpoint device 330 may be an example of the endpoint device 120 shown in FIG. 1.

In this embodiment, a signal source (not shown in FIG. 3) providing the control signal slave0 may be pre-configured as an initial master control signal source, a signal source (not shown in FIG. 3) providing the control signal slave1 may be pre-configured as a backup signal source of the signal source providing the control signal slave0, and a signal source (not shown in FIG. 3) providing the control signal slave2 may be pre-configured as a backup signal source of the signal source providing the control signal slave1, but the present invention is not limited thereto.

Figure 4:
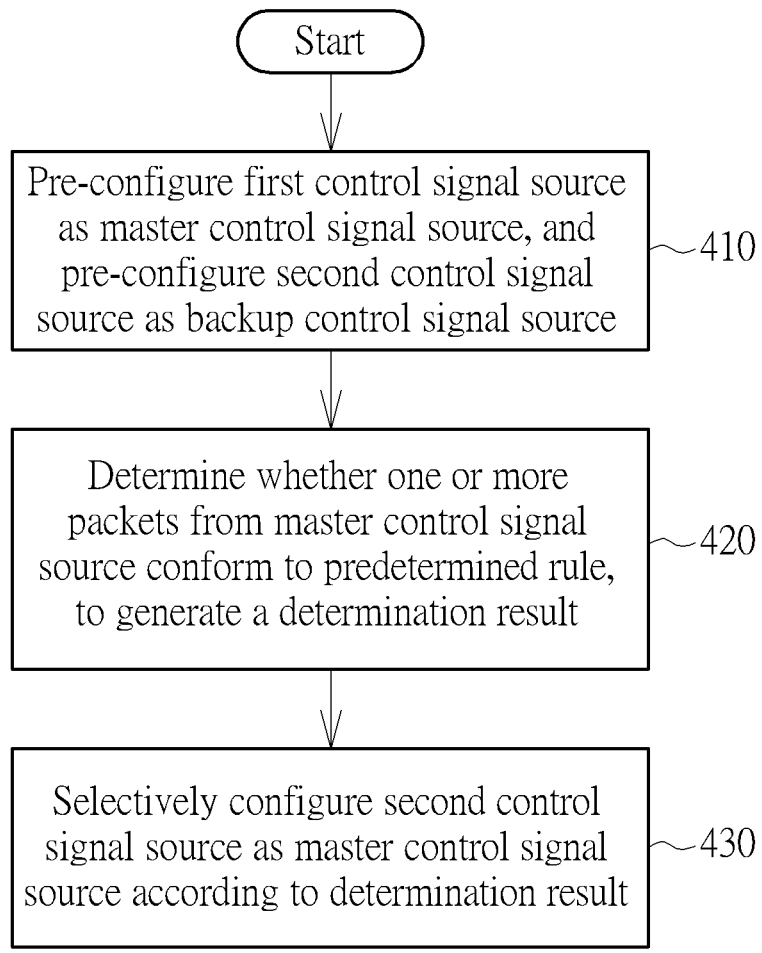
FIG. 4 illustrates a control method for a seamless Precision Time Protocol (PTP) according to an embodiment of the present invention.

FIG. 4 illustrates a control method for a seamless PTP according to an embodiment of the present invention, where the control method is applicable to the time aware bridge device 100 shown in FIG. 1, the time aware bridge device 200 shown in FIG. 2 and the time aware bridge device 300 shown in FIG. 3.

In Step 410, the time aware bridge 100 (e.g. the processing circuit 220 within the time aware bridge 200, or the selection circuit 310 within the time aware bridge device 300) may pre-configure a first control signal source (e.g. the grandmaster GMA, or the signal source of the control signal slave0) as a master control signal source, and pre-configure a second control signal source (e.g. the grandmaster GMB, or the signal sources of the control signals slave1 or slave2) as a backup control signal source.

In Step 420, the time aware bridge device 100 (e.g. the processing circuit 220 within the time aware bridge 200, or the parser 320 (more particularly, the seamless determination circuit 321 therein) within the time aware bridge device 300) may determine whether one or more packets from the master control signal source conform to at least one predetermined rule, e.g. which is the grandmaster GMA or the signal source of the control signal slave0 after the pre-configuration, to generate a determination result (e.g. sm_hit1 and/or sm_hit2 shown in FIG. 3), where the one or more packets provided by the master control signal source carry time information for performing time synchronization of one or more endpoint devices such as the endpoint device 120 coupled to the time aware bridge device 100.

In Step 430, the time aware bridge device 100 (e.g. the processing circuit 220 within the time aware bridge 200, or the selection circuit 310 within the time aware bridge device 300) may selectively configure the second control signal source as the master control signal source according to the determination result (e.g. sm_hit1 and/or sm_hit2 shown in FIG. 3). For example, when the determination result indicates that the one or more packets from the master control signal source (e.g. the first control signal source) do not conform to the at least one predetermined rule, the time aware bridge device 100 (e.g. the processing circuit 220 within the time aware bridge 200, or the selection circuit 310 within the time aware bridge device 300) may continue to configure the first control signal source as the master control signal source; and when the determination result indicates that the one or more packets from the master control signal source (e.g. the first control signal source) conform to the at least one predetermined rule, the time aware bridge device 100 (e.g. the processing circuit 220 within the time aware bridge 200, or the selection circuit 310 within the time aware bridge device 300) may configure the second control signal source as the master control signal source without running the BMCA, in order to prevent consuming additional time costs due to running the BMCA.

In one embodiment, the time aware bridge device 100 (e.g. the processing circuit 220 within the time aware bridge 200, or the parser 320 within the time aware bridge device 300) may determine whether a time difference between a time point indicated by time information (e.g. the time information carried by the control signal syncframe shown in FIG. 3) recorded by the time aware bridge device 100 and a time point indicated by time information (e.g. time information carried by one of the control signals slave0, slave1 and slave2 shown in FIG. 3, such as a control signal slavex) obtained from the grandmaster GMA is greater than a threshold value. In particular, when the parser 320 receives the control signal slavex carrying a slave time point slave_$time_x$ at a synchronization time point $sync_x$, the time aware bridge device 100 (e.g. the processing circuit 220 within the time aware bridge 200, or the parser 320 within the time aware bridge device 300) may determine whether a condition "|($sync_x$+$T_{prop}$)−slave_$time_x$|>threshold_delta" is satisfied, where $T_{prop}$ may represent a signal propagation time, and threshold_delta may represent a predetermined threshold value. If this condition is satisfied, it means a control signal source providing the control signal slavex is abnormal.

In another embodiment, the time aware bridge device 100 (e.g. the processing circuit 220 within the time aware bridge 200, or the parser 320 within the time aware bridge device 300) may obtain a first packet of the one or more packets from the master control signal source (e.g. the grandmaster GMA) at a first time point such as a synchronization time point $Sync_{i-1}$ and obtain a second packet of the one or more packets from the master control signal source (e.g. the grandmaster GMA) at a second time point such as a synchronization time point $Sync_i$, where i may represent a positive integer. The time aware bridge device 100 (e.g. the processing circuit 220 within the time aware bridge 200, or the parser 320 within the time aware bridge device 300) may calculate a time difference between the first time point and the second time point to be a receiving time difference (e.g. "$Sync_i$−$Sync_{i-1}$"), and calculate a time difference between a time point (e.g. a slave time point slave_$time_{i-1}$) indicated by time information carried by the first packet and a time point (e.g. a slave time point slave_$time_i$) indicated by time information carried by the second packet to be a time information difference (e.g. "slave_$time_i$−slave_$time_{i-1}$"). Thus, the time aware bridge device 100 (e.g. the processing circuit 220 within the time aware bridge 200, or the parser 320 within the time aware bridge device 300) may determine whether a difference between the receiving time difference and the time information difference is greater than a threshold value, e.g. determining whether a condition "|($Sync_i$−$Sync_{i-1}$)−(slave_$time_i$−slave_$time_{i-1}$)|>threshold_interval" is satisfied. If this condition is satisfied, it means the control signal source providing the control signal slavex is abnormal.

Figure 5:
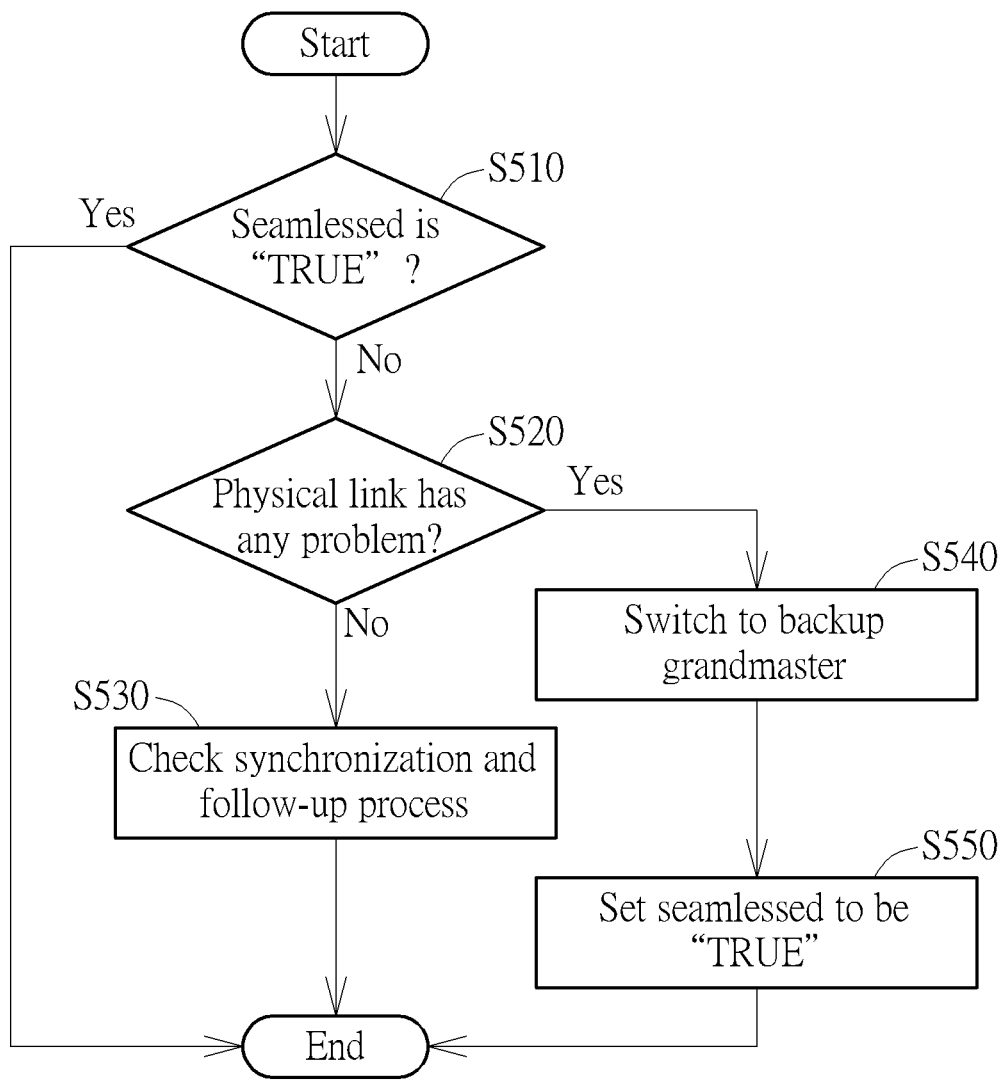
FIG. 5 is an exemplary working flow of a control method for the seamless PTP according to an embodiment of the present invention.

FIG. 5 is an exemplary working flow of a control method for the seamless PTP according to an embodiment of the present invention. Without hindering an overall result of the working flow of FIG. 5, one or more steps may be added, modified or deleted, and these steps do not have to be executed in the exact order shown in FIG. 5.

In Step S510, the time aware bridge device 100 (e.g. the processing circuit 220 within the time aware bridge 200, or the time aware bridge device 300) may determine whether a parameter seamlessed of a control signal source that is currently configured as the master control signal source shows "TRUE". If the determination result shows "Yes", it means this control signal source has been used (e.g. has been determined to be abnormal), and the flow ends; if the determination result shows "No", the flow proceeds with Step S520.

In Step S520, the time aware bridge device 100 (e.g. the processing circuit 220 within the time aware bridge 200, or the time aware bridge device 300) may determine whether a physical link has any problem. If the determination result shows "No" (which means the physical link is normal), the flow proceeds with Step S530; if the determination result shows "Yes" (which means the physical link is abnormal), the flow proceeds with Step S540.

In Step S530, the time aware bridge device 100 (e.g. the processing circuit 220 within the time aware bridge 200, or the time aware bridge device 300) may check a synchronization and follow-up process (e.g. checking whether the aforementioned conditions "|(sync$_x$+T$_{prop}$)−slave_time$_x$|>threshold_delta" and/or "|(Sync$_i$−Sync$_{i-1}$)−(slave_time$_i$−slave_time$_{i-1}$)|>threshold_interval" are satisfied), and the flow ends.

In Step S540, the time aware bridge device 100 (e.g. the processing circuit 220 within the time aware bridge 200, or the time aware bridge device 300) may switch the clock to a backup grandmaster (e.g. switch from the grandmaster GMA to the grandmaster GMB).

In Step S550, the time aware bridge device 100 (e.g. the processing circuit 220 within the time aware bridge 200, or the time aware bridge device 300) may set a corresponding parameter seamlessed of the control signal source that is replaced (e.g. the grandmaster GMA) to be "TRUE", and the flow ends.

Figure 6:
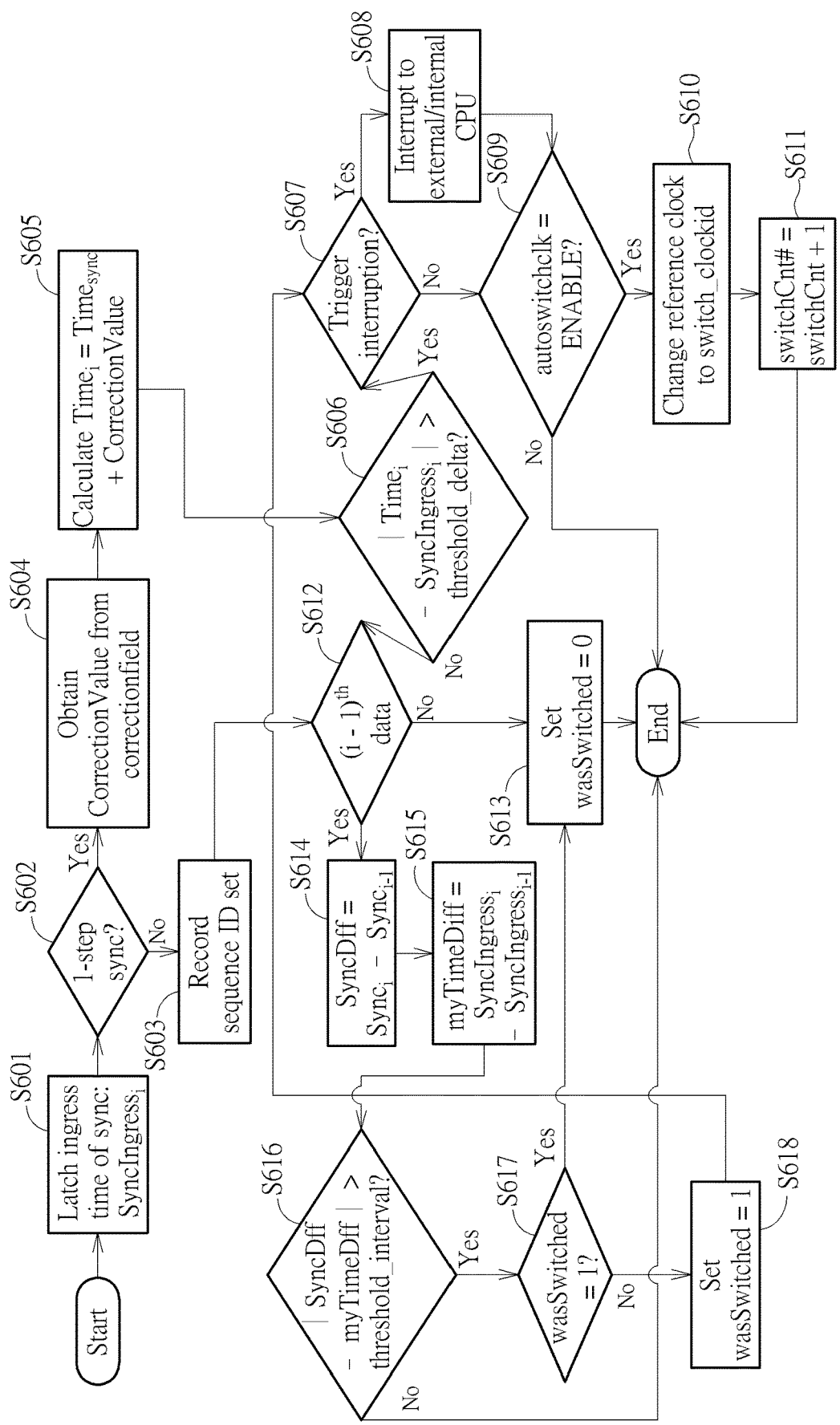
FIG. 6 is an exemplary working flow of checking a synchronization process according to an embodiment of the present invention.

FIG. 6 is an exemplary working flow of checking the synchronization process illustrated in Step S530 of FIG. 5 according to an embodiment of the present invention. Without hindering an overall result of the working flow of FIG. 6, one or more steps may be added, modified or deleted, and these steps do not have to be executed in the exact order shown in FIG. 6.

In Step S601, the time aware bridge device 100 (e.g. the processing circuit 220 within the time aware bridge 200, or the time aware bridge device 300) may latch ingress time SyncIngress$_i$ of a control signal sync (e.g. the control signal syncframe shown in FIG. 3).

In Step S602, the time aware bridge device 100 (e.g. the processing circuit 220 within the time aware bridge 200, or the time aware bridge device 300) may determine whether this working flow is 1-step synchronization (sync). If the determination result shows "Yes", the flow proceeds with Step S604; if the determination result shows "No", the flow proceeds with Step S603.

In Step S603, the time aware bridge device 100 (e.g. the processing circuit 220 within the time aware bridge 200, or the time aware bridge device 300) may record a sequence identification (ID) set.

In Step S604, the time aware bridge device 100 (e.g. the processing circuit 220 within the time aware bridge 200, or the time aware bridge device 300) may obtain a correction value CorrectionValue from a field correctionfield of a packet carried by the control signal sync.

In Step S605, the time aware bridge device 100 (e.g. the processing circuit 220 within the time aware bridge 200, or the time aware bridge device 300) may calculate a parameter Time$_i$ =Time$_{sync}$+CorrectionValue, where Time$_{sync}$ may be time information carried by a packet from the master control signal source.

In Step S606, the time aware bridge device 100 (e.g. the processing circuit 220 within the time aware bridge 200, or the time aware bridge device 300) may determine whether a condition "|Time$_i$−SyncIngress$_i$|>threshold_delta" is satisfied. If the determination result is "Yes", the flow proceeds with Step S607; if the determination result is "No", the flow proceeds with Step S612.

In Step S607, the time aware bridge device 100 (e.g. the processing circuit 220 within the time aware bridge 200, or the time aware bridge device 300) may determine whether to trigger interruption. If the determination result shows "Yes", the flow proceeds with Step S608; if the determination result shows "No", the flow proceeds with Step S609.

In Step S608, the time aware bridge device 100 (e.g. the processing circuit 220 within the time aware bridge 200, or the time aware bridge device 300) may transmit an interruption request to an external/internal central processing unit (CPU), and is labeled "Interrupt to external/internal CPU" in FIG. 6 for brevity. This interruption request may be a mandatory or warning request, and the external/internal CPU may determine whether to execute an interruption process. The recovery process after the interruption is omitted in the embodiments of present invention.

In Step 609, the time aware bridge device 100 (e.g. the processing circuit 220 within the time aware bridge 200, or the time aware bridge device 300) may determine whether an auto switch function is enabled (e.g. determining whether a condition "autoswitchclk=ENABLE" is satisfied, where autoswitchclk may be an example of auto_sw_clk shown in FIG. 3). If the determination result shows "Yes", the flow proceeds with Step S610; if the determination result shows "No", the flow ends.

In Step S610, the time aware bridge device 100 (e.g. the processing circuit 220 within the time aware bridge 200, or the time aware bridge device 300) may change a reference clock to a backup clock switch_clockid.

In Step S611, the time aware bridge device 100 (e.g. the processing circuit 220 within the time aware bridge 200, or the time aware bridge device 300) may update (e.g. increase) a count value switchCnt (which is labeled "switchCnt #=switchCnt+1" for better comprehension). This step may be arranged to calculate a count of switching executed by the time aware bridge device 100.

In Step S612, the time aware bridge device 100 (e.g. the processing circuit 220 within the time aware bridge 200, or the time aware bridge device 300) may determine whether (i−1)$^{th}$ data is received (e.g. a control signal sync$_{i-1}$ corresponding to an ingress time SyncIngress$_{i-1}$). If the determination result shows "Yes", the flow proceeds with Step S614; if the determination result shows "No", the flow proceeds with Step S613.

In Step S613, the time aware bridge device 100 (e.g. the processing circuit 220 within the time aware bridge 200, or the time aware bridge device 300) may set a parameter wasSwitched=0 (i.e. resetting a value of the parameter wasSwitched, which may be regarded as lowering a flag), where the parameter wasSwitched may be an example of the parameter seamlessed illustrated in the embodiment of FIG. 5.

In Step S614, the time aware bridge device 100 (e.g. the processing circuit 220 within the time aware bridge 200, or the time aware bridge device 300) may calculate a parameter SyncDiff=Sync$_i$−Sync$_{i-1}$. This step is arranged to calculate a difference of actual time information between an i$^{th}$ data packet and an (i−1)$^{th}$ data packet.

In Step S615, the time aware bridge device 100 (e.g. the processing circuit 220 within the time aware bridge 200, or the time aware bridge device 300) may calculate a parameter myTimeDiff=SyncIngress$_i$−SyncIngress$_{i-1}$. This step is arranged to calculate a time difference between the current ingress time SyncIngress$_1$ and a previous (e.g. last) ingress time SyncIngress$_{i-1}$ latched by the time aware bridge device 100, and thereby reflect a time difference of the time aware bridge 100 (e.g. a time difference recorded by the time aware bridge 100).

In Step S616, the time aware bridge device 100 (e.g. the processing circuit 220 within the time aware bridge 200, or the time aware bridge device 300) may determine whether a condition "|SyncDiff−myTimeDiff|>threshold_interval" is satisfied. If the determination result shows "Yes", the flow proceeds with Step S617; if the determination result shows "No", the flow ends. This step is arranged to determine whether a difference between the time difference of the time aware bridge 100 and the difference of the actual time information of the data packets exceeds a threshold interval.

In Step S617, the time aware bridge device 100 (e.g. the processing circuit 220 within the time aware bridge 200, or the time aware bridge device 300) may determine whether the parameter wasSwitched is equal to "1". If the determination result shows "Yes", the flow proceeds with Step S613; if the determination result shows "No", the flow proceeds with Step S618.

In Step S618, the time aware bridge device 100 (e.g. the processing circuit 220 within the time aware bridge 200, or the time aware bridge device 300) may set the parameter wasSwitched=1 (which may be regarded as raising the flag), and the flow proceeds with Step S607 (if the determination result of Step S609 shows "Yes", the time aware bridge device 100 will switch the clock to a new control signal source). Deduced by analogy, in determination of a next round, Step S613 following Step S617 (as the flag is not lowered) may result in the parameter wasSwitched being reset, and in determination of yet a next round, Step S618 following Step S617 may result in the flag being raised and switching the control signal source.

Figure 7:
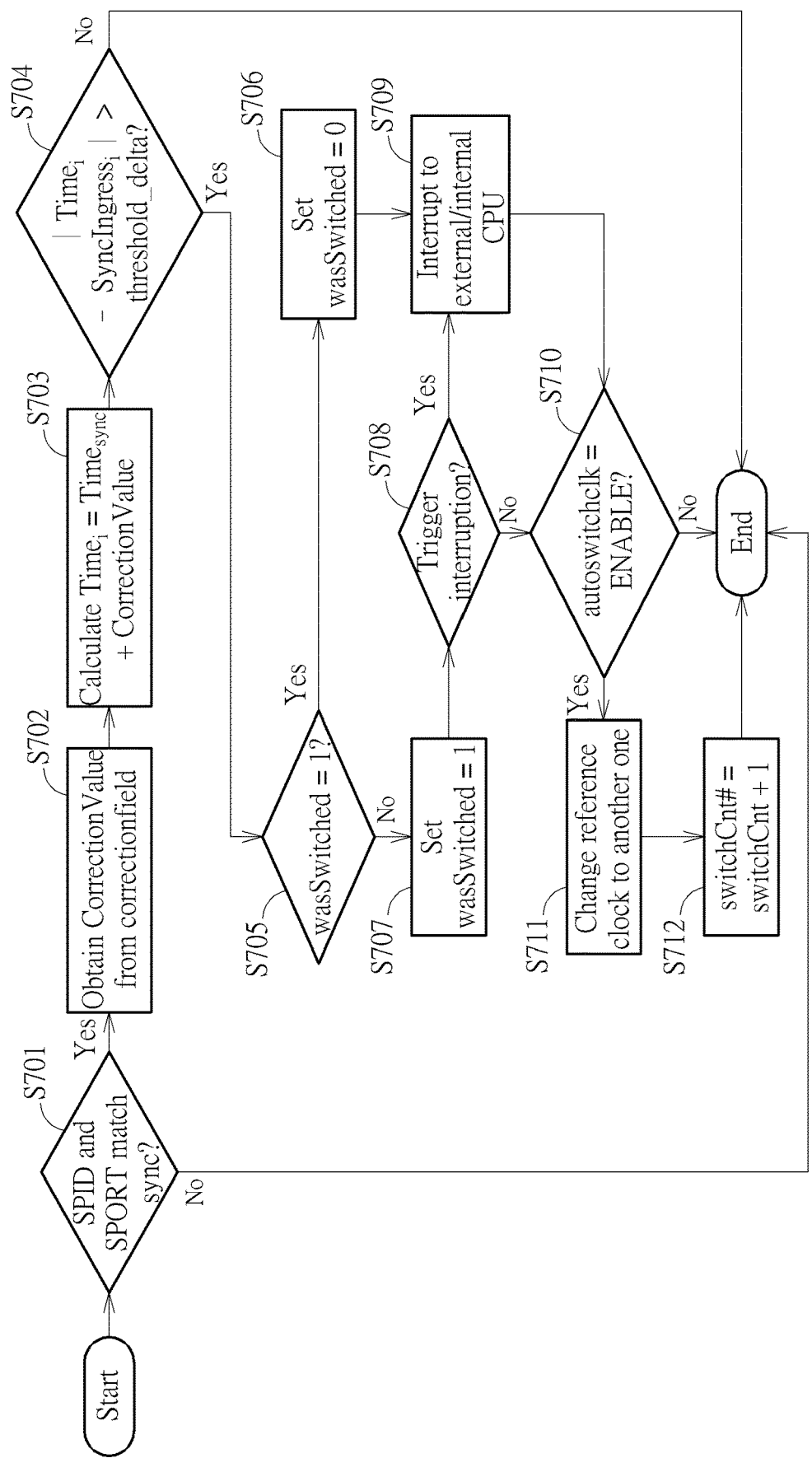
FIG. 7 is an exemplary working flow of checking a follow-up process according to an embodiment of the present invention

FIG. 7 is an exemplary working flow of checking the follow-up process illustrated in Step S530 of FIG. 5 according to an embodiment of the present invention. Without hindering an overall result of the working flow of FIG. 7, one or more steps may be added, modified or deleted, and these steps do not have to be executed in the exact order shown in FIG. 7.

In Step S701, the time aware bridge device 100 (e.g. the processing circuit 220 within the time aware bridge 200, or the time aware bridge device 300) may determine whether parameters SPID and SPORT match the control signal sync. If the determination result shows "Yes", the flow proceeds with Step S702; if the determination result shows "No", the flow ends.

In Step S702, the time aware bridge device 100 (e.g. the processing circuit 220 within the time aware bridge 200, or the time aware bridge device 300) may obtain the correction value CorrectionValue from the field correctionfield of the packet carried by the control signal sync.

In Step S703, the time aware bridge device 100 (e.g. the processing circuit 220 within the time aware bridge 200, or the time aware bridge device 300) may calculate the parameter $Time_i = Time_{sync} + CorrectionValue$.

In Step S704, the time aware bridge device 100 (e.g. the processing circuit 220 within the time aware bridge 200, or the time aware bridge device 300) may determine whether a condition "|Time_i−SyncIngress_i|>threshold_delta" is satisfied. If the determination result shows "Yes", the flow proceeds with Step S705; if the determination result shows "No", the flow ends.

In Step S705, the time aware bridge device 100 (e.g. the processing circuit 220 within the time aware bridge 200, or the time aware bridge device 300) may determine whether the parameter wasSwitched is equal to "1". If the determination result shows "Yes", the flow proceeds with Step S706; if the determination result shows "No", the flow proceeds with Step S707.

In Step S706, the time aware bridge device 100 (e.g. the processing circuit 220 within the time aware bridge 200, or the time aware bridge device 300) may set wasSwitched=0 (i.e. resetting the value of the parameter wasSwitched, which may be regarded as lowering the flag).

In Step S707, the time aware bridge device 100 (e.g. the processing circuit 220 within the time aware bridge 200, or the time aware bridge device 300) may set wasSwitched=1 (which may be regarded as raising the flag). Deduced by analogy, in determination of a next round, Step S706 following Step S705 (as the flag is not lowered) may result in the parameter wasSwitched being reset, and in determination of yet a next round, Step S707 following Step S705 may result in the flag being raised and switching the control signal source.

In Step S708, the time aware bridge device 100 (e.g. the processing circuit 220 within the time aware bridge 200, or the time aware bridge device 300) may determine whether to trigger interruption. If the determination result shows "Yes", the flow proceeds with Step S709; if the determination result shows "No", the flow proceeds with Step S710.

In Step S709, the time aware bridge device 100 (e.g. the processing circuit 220 within the time aware bridge 200, or the time aware bridge device 300) may execute an interruption process on the external/internal CPU (e.g. transmitting an interruption request to the external/internal CPU), and is labeled "Interrupt to external/internal CPU" in FIG. 7 for brevity. The recovery process after the interruption may be omitted in the embodiments of present invention, and alternative approaches are possible.

In Step S710, the time aware bridge device 100 (e.g. the processing circuit 220 within the time aware bridge 200, or the time aware bridge device 300) may determine whether the auto switch function is enabled (e.g. determining whether a condition "autoswitchclk=ENABLE" is satisfied). If the determination result shows "Yes", the flow proceeds with Step S711; if the determination result shows "No", the flow ends.

In Step S711, the time aware bridge device 100 (e.g. the processing circuit 220 within the time aware bridge 200, or the time aware bridge device 300) may change the reference clock to another one (e.g. switching from the grandmaster GMA to the grandmaster GMB).

In Step S712, the time aware bridge device 100 (e.g. the processing circuit 220 within the time aware bridge 200, or the time aware bridge device 300) may update (e.g. increase) the count value switchCnt (which is labeled "switchCnt #=switchCnt+1" for better comprehension), to calculate the count of switching executed by the time aware bridge device 100.

To summarize, the embodiments of the present invention provide a control method and an associated time aware bridge device for seamless PTP, which can pre-configure one of a plurality of control signal sources as a master control signal source, and pre-configure another control signal source thereof as a backup control signal source of the master control signal source. When certain condition(s) is/are satisfied, the time aware bridge device of the present invention can utilize the backup control signal source to replace the original master control signal source, to ensure that the time synchronization operation can be properly performed under various situations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a seamless Precision Time Protocol (PTP), comprising:
utilizing a time aware bridge device to pre-configure a first control signal source as a master control signal source and pre-configure a second control signal source as a backup control signal source;
utilizing the time aware bridge device to determine whether one or more packets from the master control signal source conform to at least one predetermined rule, to generate a determination result, wherein the time aware bridge device obtains a first packet of the one or more packets from the master control signal source at a first time point and obtains a second packet of the one or more packets from the master control signal source at a second time point, and the determination result is generated according to the first time point, the second time point, time information carried by the first packet and time information carried by the second packet; and
selectively configuring the second control signal source as the master control signal source according to the determination result;
wherein the step of selectively configuring the second control signal source as the master control signal source according to the determination result comprises:
when the determination result indicates that the one or more packets from the first control signal source conform to the at least one predetermined rule, configuring the second control signal source as the master control signal source without running a Best Master Clock Algorithm (BMCA).

2. The control method of claim 1, wherein the one or more packets provided by the master control signal source carry time information arranged for performing time synchronization of one or more endpoint devices coupled to the time aware bridge device.

3. The control method of claim 1, wherein the first control signal source corresponds to a first time domain, and the second control signal source corresponds to a second time domain.

4. The control method of claim 1, wherein the step of selectively configuring the second control signal source as the master control signal source according to the determination result comprises:
when the determination result indicates that the one or more packets from the first control signal source do not conform to the at least one predetermined rule, continuing to configure the first control signal source as the master control signal source.

5. The control method of claim 1, wherein the step of utilizing the time aware bridge device to determine whether the one or more packets from the master control signal source conform to the at least one predetermined rule to generate the determination result comprises:
determining whether a time difference is greater than a threshold value, wherein the time difference is between a time point indicated by time information recorded by the time aware bridge device and a time point indicated by time information obtained from the master control signal source.

6. The control method of claim 1, wherein the step of utilizing the time aware bridge device to determine whether the one or more packets from the master control signal source conform to the at least one predetermined rule to generate the determination result comprises:

calculating a time difference between the first time point and the second time point to be a receiving time difference;
calculating a time difference between a time point indicated by time information carried by the first packet and a time point indicated by time information carried by the second packet to be a time information difference; and
determining whether a difference between the receiving time difference and the time information difference is greater than a threshold value.

7. A time aware bridge device for a seamless Precision Time Protocol (PTP), comprising:
a storage device, arranged to store a program code;
a processing circuit, coupled to the storage device, arranged to control operations of the time aware bridge device according to the program code, wherein the operations comprise:
the processing circuit pre-configures a first control signal source as a master control signal source and pre-configures a second control signal source as a backup control signal source;
the processing circuit determines whether one or more packets from the master control signal source conform to at least one predetermined rule, to generate a determination result, wherein the processing circuit obtains a first packet of the one or more packets from the master control signal source at a first time point and obtains a second packet of the one or more packets from the master control signal source at a second time point, and the determination result is generated according to the first time point, the second time point, time information carried by the first packet and time information carried by the second packet; and
the processing circuit selectively configures the second control signal source as the master control signal source according to the determination result;
wherein when the determination result indicates that the one or more packets from the first control signal source conform to the at least one predetermined rule, the processing circuit configures the second control signal source as the master control signal source without running a Best Master Clock Algorithm (BMCA).

8. The time aware bridge device of claim 7, wherein the one or more packets provided by the master control signal source carry time information arranged for performing time synchronization of one or more endpoint devices coupled to the time aware bridge device.

9. The time aware bridge device of claim 7, wherein the first control signal source corresponds to a first time domain, and the second control signal source corresponds to a second time domain.

10. The time aware bridge device of claim 7, wherein:
when the determination result indicates that the one or more packets from the first control signal source do not conform to the at least one predetermined rule, the processing circuit continues to configure the first control signal source as the master control signal source.

11. The time aware bridge device of claim 7, wherein the operation of the processing circuit determining whether the one or more packets from the master control signal source conform to the at least one predetermined rule to generate the determination result comprises:
the processing circuit determines whether a time difference is greater than a threshold value, wherein the time difference is between a time point indicated by time information recorded by the time aware bridge device and a time point indicated by time information obtained from the master control signal source.

12. The time aware bridge device of claim 7, wherein the operation of the processing circuit determining whether the one or more packets from the master control signal source conform to the at least one predetermined rule to generate the determination result comprises:
the processing circuit calculates a time difference between the first time point and the second time point to be a receiving time difference;
the processing circuit calculates a time difference between a time point indicated by time information carried by the first packet and a time point indicated by time information carried by the second packet to be a time information difference; and
the processing circuit determines whether a difference between the receiving time difference and the time information difference is greater than a threshold value.

13. A time aware bridge device for a seamless Precision Time Protocol (PTP), comprising:
a selection circuit, arranged to pre-configure a first control signal source as a master control signal source and pre-configure a second control signal source as a backup control signal source; and
a parser, arranged to determine whether one or more packets from the master control signal source conform to at least one predetermined rule, to generate a determination result, wherein the parser obtains a first packet of the one or more packets from the master control signal source at a first time point and obtains a second packet of the one or more packets from the master control signal source at a second time point, and the determination result is generated according to the first time point, the second time point, time information carried by the first packet and time information carried by the second packet;
wherein the selection circuit selectively configures the second control signal source as the master control signal source according to the determination result, and when the determination result indicates that the one or more packets from the first control signal source conform to the at least one predetermined rule, the selection circuit configures the second control signal source as the master control signal source without running a Best Master Clock Algorithm (BMCA).

14. The time aware bridge device of claim 13, wherein the one or more packets provided by the master control signal source carry time information arranged for performing time synchronization of one or more endpoint devices coupled to the time aware bridge device.

15. The time aware bridge device of claim 13, wherein the first control signal source corresponds to a first time domain, and the second control signal source corresponds to a second time domain.

16. The time aware bridge device of claim 13, wherein:
when the determination result indicates that the one or more packets from the first control signal source do not conform to the at least one predetermined rule, the selection circuit continues to configure the first control signal source as the master control signal source.

17. The time aware bridge device of claim 13, wherein the operation of the parser determining whether the one or more packets from the master control signal source conform to the at least one predetermined rule to generate the determination result comprises:
the parser determines whether a time difference is greater than a threshold value, wherein the time difference is between a time point indicated by time information recorded by the time aware bridge device and a time point indicated by time information obtained from the master control signal source.

18. The time aware bridge device of claim 13, wherein the operation of the parser determining whether the one or more packets from the master control signal source conform to the at least one predetermined rule to generate the determination result comprises:
the parser calculates a time difference between the first time point and the second time point to be a receiving time difference;
the parser calculates a time difference between a time point indicated by time information carried by the first packet and a time point indicated by time information carried by the second packet to be a time information difference; and
the parser determines whether a difference between the receiving time difference and the time information difference is greater than a threshold value.

* * * * *